Figure 2:
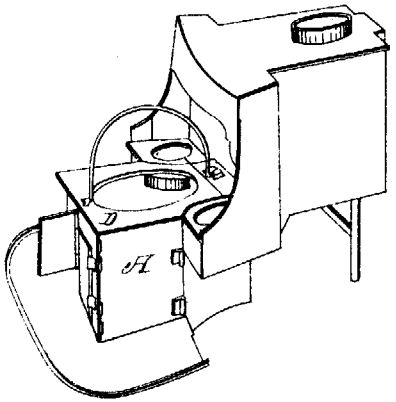
Figure 3:
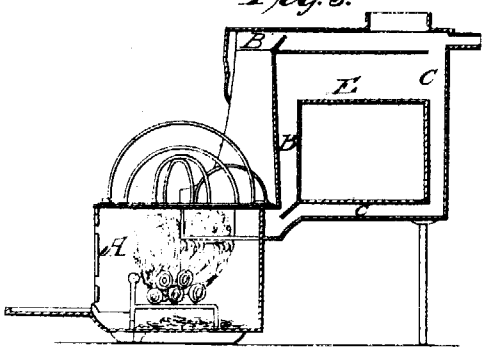
Figure 1:
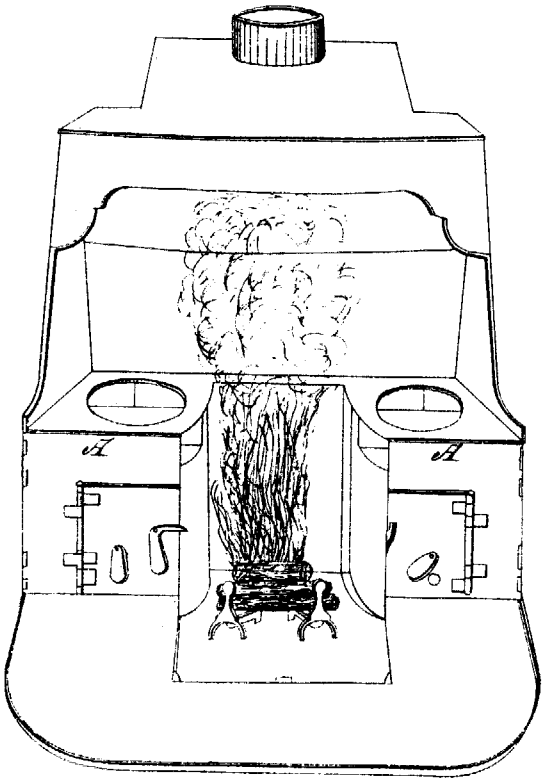

9690X

E. G. CURRIER.

COOKING STOVE.

Patented June 2, 1836.

Perspective view of stove closed.

Section of stove closed.

Front view of stove opened.

Ezekiel G. Currier of Warner State of New Hampshire

Letters Patent. Stove No 1

The schedule referred to in these Letters Patent and making part of the
same containing a description in the words of the said Ezekiel G. Currier
himself of his improvement on the open and close Cooking Stove No. 1.

To all to whom these presents shall come,
Be it known that I Ezekiel G. Currier of Warner, in the county of
Merrimack and State of New Hampshire, have invented a new
and useful improvement in the "Open and Close Stove, designated
as No. 1." By the manner of arrangement and construction of which
combination I produce either an Open or a Close stove, as circumstances
may require; in a manner better suited to domestic convenience, than has
heretofore been done. It presents in appearance the front of the ordinary
Franklin open stove, having the Jambs on each side extended or widened hori-
zontally, from that part intended to contain the fire, and to form the body of the
close stove, and on a line with what may be the desired height thereof.
These extensions are to serve for the support of a cooking vessel on each side,
and for that purpose have a circular hole on the top and are made hollow,
with a flue communicating with the interior [illegible] body of the stove, so that
the draught from it passes under the vessel & out at the back of the hollow
space, into an apartment at the back of the Franklin, which reaches from the
horizontal line of the extensions at the sides, to the top of the Franklin and
also runs as far as desired backwards, thereby forming a square enclosure intend-
ed to surround the same, which is formed of four other plates constituting
the top, bottom, and sides of it, leaving of course a space between them &
the corresponding ones of the apartment above described, for the circulation of
draught of heat & smoke around it; the ends of the oven are formed by the
sides of the apartment & are not double, one containing the door to it. The
aperture for the draught from the back of the hollow spaces at the sides, leading into the apartment, is furnished with a damper, to each, so fastened to the
lower angle of the oven bottom, as to close up the space left between it, & the
bottom of the apartment, or that between the back of the Franklin & the
adjoining side of the oven, according to which ever direction the rotation of the
axis of the damper is conducted, by means of a handle which is placed for
that purpose, projecting conveniently through that side of the apartment, and
thus the draught can be managed, as to throw the heat either under the oven
and up the back side thereof into the scape pipe for the smoke (at the top
of the apartment,) or by closing that opening beneath the oven, to conduct it
up the space behind the Franklin & thence over the top of the oven, to the
said escape pipe. The heat may also be divided equally in its distribu-
-tion by opening different apertures, so as to send a portion of the heat above
and another below the oven, as may be found most expedient. Above the
oven, and between it & the top of the apartment, are placed two other plates
in a horizontal position; the upper one extending from the draught open-
ing on the front of the Franklin, to about the centre of a circular opening in the top
plate of the apartment; which is intended to receive a vessel for heating water,
&c & is made with a rim around it, on which to set the vessel; & also
to receive the pipe by which the smoke is to escape; for which reason
said rim & hole, are placed as far back, on the top plate as is practica-
ble, and the upper plate turns up by a perpendicular edge so as to meet it,
& thus bring all the heat from the Franklin or open stove under said
vessel when the close one is not wanted, to be used.

The plate beneath the upper one, is extended from one side of the
apartment to the other, leaving a space open only between it, & the
back of the Franklin, & between it & the back of the apartment, for
continuing the draught; and these openings are each furnished with a
damper, so as to regulate it, for it will be seen that on opening the damper
first described, behind the hollow space, by closing that beneath the oven,
the draught will rise behind the Franklin to the damper at the plate
last described, above the oven, where it may be allowed to pass, and con-
tinue on to the vessel of water & finally escape, or the damper placed
there, may be closed on the plate, & thus send the draught up over the top of the oven, to the opposite one, which being opened allows a passage up again to the escape pipe; or again, the first damper being removed, in position closes the aperture leading up the back of the Franklin, & opens the draught under the oven, and up the back side thereof, to the last described damper which may be either opened and allow the passage on to the escape pipe; or it may be closed & continue the draught over the oven, to the opposite damper, at the back of the Franklin, where it will be allowed to escape; & in all or either of the situations, the vessel of water at the top, receives the heat previous to its escape. At the bottom plate of the stove, upon which the fire is to be placed, is formed a hearth by sinking a bed; and around this, drawn two folding sides; which close by a hinge joint, & shut up against the side extensions of the jambs, when not wanted for the close stove, & thereby form a finish to the open stove, connecting the side extensions with the bottom or bed plate, But when drawn around the sunken bed, by unfolding the joints, they are secured at the proper angle, by short flanges at the edge of the bed on the inside, the front leaves, or folds, containing the doors of the close stove, as usual, and the whole secured together by the top plate, having proper flanges for that purpose, & the surface containing the usual arrangements for cooking vessels. In order to remove this plate & fold up the close stove sides while yet warm; I use a semicircular handle, which is to be attached in a moment to the top plate, by an ear left open at one of its sides, & cast into the plate, so that it may be slipped into it sideways, & at the other end, or the back of the plate, I use a fixed flat staple cast into it, in which I first thrust the broad flattened end of the handle which in that shape prevents the possibility of tilting; & then slip in the other small end into the side of the ear, by which means the hot plate can be removed safely, & the handle applied at a moments notice In order to get rid of the steam which may be produced in the operation of baking in the oven, I perforate the top plate of it in two or more places, so as to allow it to escape into the draught of the flue; proper legs are to be used to support the apartment & oven as well as the stove. & also rods and scrapers are to be used for cleaning out the soot as is usual, 228. 9690X

What I claim as my invention is not the principle of changing an open to a close stove or the contrary, but the arrangements of the folding sides connected by the moveable top piece as described, to form the close stove from an open one, or Frankline and also the peculiar adaptation of the flues & dampers, as set forth, in order to conduct the circulation through the jambs, and around the oven, to be managed at pleasure according to the description thereof. the whole forming a combination to the best of my belief new, & not before used. In testimony whereof I have hereunto set my hand this eleventh day of April Eighteen hundred & thirty six

Witnesses
Frankn. Pierce
D. A. Hale

Ezekiel G. Carrier

Exd
W.H.

[1664 w. Ex]

(Patented June 2. 1836)

Drawing